United States Patent Office 3,726,861
Patented Apr. 10, 1973

3,726,861
UREIDO DERIVATIVES OF 6-AMINOPENI-
CILLANIC ACID SACCHARIMIDE
James L. Diebold, Broomall, and Milton Wolf, West
Chester, Pa., assignors to American Home Products
Corporation, New York, N.Y.
No Drawing. Filed June 3, 1971, Ser. No. 149,819
Int. Cl. C07d 99/16
U.S. Cl. 260—239.1                                       4 Claims

ABSTRACT OF THE DISCLOSURE

Novel antibiotic compounds have been prepared which have the following generic formula:

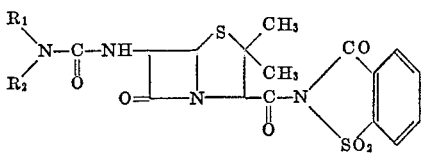

Description of the invention.—This invention is concerned with the production of novel amides of ureidopenicillanic acids. They may be characterized by Formula I:

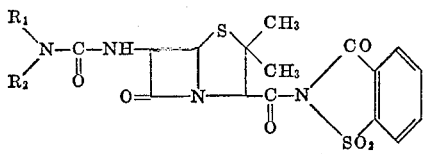

where $R_1$ is selected from the group consisting of hydrogen, (lower)alkyl, halophenyl, phenyl, phen(lower)alkyl and naphthyl; $R_2$ is selected from the group consisting of hydrogen, (lower)alkyl, halophenyl, phenyl phen(lower)alkyl, naphthyl,

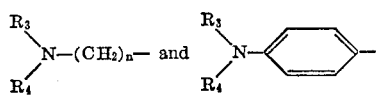

wherein $R_3$ and $R_4$ when taken separately are selected from the group consisting of (lower)alkyl, phenyl, phen-(lower)alkyl, halophenyl, naphthyl or $R_3$ and $R_4$ may be concatenated together to form a heterocyclic ring selected from the group consisting of morpholino, piperidino, N-alkylpiperazino and pyrrolidino; $n$ is the integer 2, 3 or 4.

The compounds of the invention are prepared by the following reaction scheme:

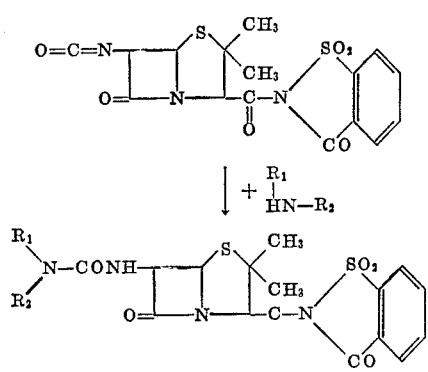

The reaction is conducted by admixing the reactants separately in an organic solvent such as methylene chloride, tetrahydrofuran, chloroform or the like and then combining the two mixtures in a suitable reaction vessel. The reaction may be conducted at room temperature or the reactants may be cooled to a temperature of about —60° C. to about 10° C. The reaction time is not critical and may vary from a few minutes to several hours. Thereafter the solvent is removed by evaporation or by other appropriate techniques to yield the product.

The compounds of the invention are antibiotically active and may be used to treat infections caused by susceptible organisms. They may be used for the treatment of bovine mastitis or for growth promotion of animals such as domestic cattle and hogs. The compounds of the invention are also useful for the inhibition of Staph. aureus, Smith at a concentration of less than 50 micrograms/ml. when applied in an aqueous vehicle.

As used herein and in the appended claims the term (lower)alkyl is used to include straight and branched chain hydrocarbon groups containing from 1 to about 6 carbon atoms such as methyl, ethyl, i-propyl, n-hexyl and the like.

EXAMPLE I 1-butyl-3-[3,3-dimethyl - 7 - oxo-2-(3-oxo-1,2-benzisothi-
azolin-2-ylcarbonyl)-4-thia - 1 - azabicyclo[3.2.0]hept-
6-yl]urea S',S'-dioxide To a solution of 2,5 g. (0.00614 m.) of 2-[(6-isocyanato-3,3 - dimethyl - 7-oxo-4-thia-1-azabicyclo[3,2,0]hept-2-yl) carbonyl]1,2-benzisothiazolin-3-one 1,1-dioxide in 50 ml. of dried methylene chloride at —50° C. was slowly added 0.675 ml. (0.00682 m.) of n-butylamine in 20 ml. of dried methylene chloride. The solution was stirred for 1.5 hrs. at —50° C. and then another hour at 25° C. The solvent was removed by evaporation leaving a solid.

IR (in KBr) absorption maxima $5.5\mu$, $5.7\mu$, $6.0\mu$, $6.5\mu$. Iodometric assay 65%.

EXAMPLE II

3-[3,3-dimethyl-7-oxo - 2 - (3-oxo-1,2-benzisothiazolin-
2-ylcarbonyl)-4-thia - 1 - azabicyclo[3.2.0]hept-6-yl]-
1-(a,a-dimethylphenethyl)-1-methylurea S',S'-dioxide A solution of 3.00 g. of 2-[(6-isocyanato-3,3-dimethyl-7-oxo-4-thiaz - 1 - azabicyclo[3.2.0]hept-2-yl)carbonyl]-1,2-benzisothiazolin-3-one 1,1-dioxide (0.00736 m.) in 50 ml. of dried tetrahydrofuran and a solution of 1.20 g. of N-methyl-ω-phenyl-t-butylamine (0.00736 m.) in 20 ml. of dried tetrahydrofuran were added together at room temperature and stirred for 2 hrs. 20 min. The solvent was removed by evaporation leaving a bright yellow solid.

IR (in KBr) absorption maxima $3.0\mu$, $5.6\mu$, $5.75\mu$, $6.1\mu$, $6.7\mu$, iodometric assay 33%.

EXAMPLE III

1-[3,3-dimethyl-7-oxo-2-(3-oxo - 1,2 - benzisothiazolin-
2-ylcarbonyl) - 4 - thia-1-azabicyclo[3.2.0]hept-6-yl]-
3-(3-morpholinopropyl)urea S',S'-dioxide To a solution of 3.0 g. of 2-[(6-isocyanato-3,3-dimethyl-7-oxo-4-thia - 1 - azabicyclo[3.2.0]hept-2-yl)carbonyl]-1,2-benzisothiazolin-3-one 1,1-dioxide (0.00736 m.) in 60 ml. of dried methylene chloride was added a solution of 1.06 g. of N-(γ-aminopropyl)morpholine (0.00735 m.) in 35 ml. of dried methylene chloride over a period of 15 minutes at —45° to —38°. After stirring an additional 2¾ hrs. at this temperature, the solvent was removed by evaporation leaving an off-white solid.

IR (in KBr) absorption maxima, $3.0\mu$, $5.5\mu$, $5.6\mu$, $5.75\mu$, $6.0\mu$, $6.4\mu$. Iodometric assay 59%.

EXAMPLE IV

By analogous methods to those employed hereinabove, the following compounds are prepared:

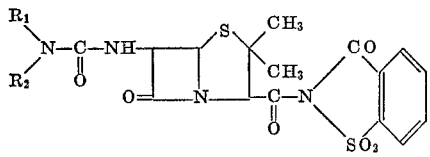

wherein $R_1$ and $R_2$ are as follows:

| $R_1$ | $R_2$ |
|---|---|
| Cl—⟨phenyl⟩— | $CH_3$—$CH_2$—$CH_2$— |
| Br—⟨phenyl⟩— | $CH_3$—$CH_2$— |
| ⟨phenyl⟩—$CH_2$— | H |
| $CH_3CH_2$— | $CH_3$—$CH_2$— |
| ⟨phenyl⟩— | $CH_3$— |
| $CH_3$—$CH_2$—$CH_2$— | $CH_3$ |
| $CH_3$—$CH_2$— | $CH_3CH_2$ |
| ⟨phenyl⟩—$CH_2$—$CH_2$— | ⟨phenyl⟩— |
| ⟨naphthyl⟩— | $CH_3$— | when $R_2$ is

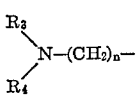

and $R_3$ and $R_4$ are taken separately, the following compounds are prepared:

| $R_3$ | $R_4$ | $n$ |
|---|---|---|
| $CH_3$— | $CH_3$— | 2 |
| Cl—⟨phenyl⟩— | H | 2 |
| ⟨phenyl⟩—$CH_2$— | ⟨phenyl⟩—$CH_2$— | 3 |
| ⟨phenyl⟩— | ⟨phenyl⟩— | 2 |
| ⟨phenyl⟩— | $CH_3CH_2$— | 4 |
| ⟨naphthyl⟩— | $CH_3CH_2CH_2$— | 2 | when $R_2$ is

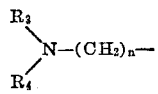

and $R_3$ and $R_4$ are concatenated together to form with the nitrogen atom a heterocyclic ring, the following compounds are prepared:

| $R_3$ $R_4$ | $n$ |
|---|---|
| morpholino | 2 |
| N-methylpiperidino | 3 |
| pyrrolidino | 2 | when $R_2$ is

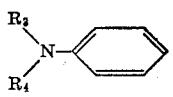

the following compounds may be prepared:

| $R_3$ | $R_4$ |
|---|---|
| $CH_3$— | $CH_3$ |
| ⟨phenyl⟩— | ⟨phenyl⟩— |
| | $CH_3$ |
| Cl—⟨phenyl⟩— | $CH_3$ |
| | $CH_3CH_2$— |
| ⟨naphthyl⟩— | |
| $CH_3CH_2CH_2CH_2$— | H |

The saccharimide of 6-isocyanato penicillanic acid may be prepared according to the methods set out in U.S. patent application Ser. No. 149,817 which is cofiled as of even date herewith in the names of Milton Wolf, James Diebold and Scott J. Childress and titled, Amides of 6-isocyanatopenicillanic Acid.

We claim:
1. A compound of the formula:

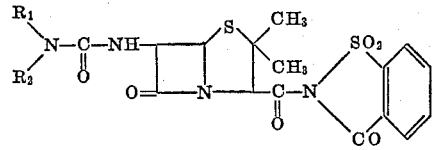

where
$R_1$ is selected from the group consisting of hydrogen and (lower)alkyl;
$R_2$ is selected from the group consisting of hydrogen, (lower)alkyl, phen(lower)alkyl and $$\underset{R_4}{\overset{R_3}{N}}-(CH_2)_n-$$

in which $R_3$ and $R_4$ are concatenated together to form a heterocyclic ring selected from the group consisting of morpholino, piperidino, N-alkylpiperazino and pyrrolidino; and $n$ is one of the integers 2, 3 or 4.

2. A compound as defined in claim 1 which is: 1-butyl-3-[3,3 - dimethyl - 7 - oxo-2-(3-oxo-1,2-benzisothiazolin-2-ylcarbonyl)-4-thia - 1 - azabicyclo[3.2.0]hept-6-yl]urea S',S'-dioxidde.

3. A compound as defined in claim 1 which is: 3-[3,3-dimethyl - 7 - oxo-1,2-benzisothiazolin-2-ylcarbonyl)-4-thia-1-aza-bicyclo[3.2.0]hept - 6 - yl]-(a,a-dimethylphenethyl)-1-methylurea S',S'-dioxide.

4. A compound as defined in claim 1 which is: 1-[3,3-dimethyl-7-oxo - 2 - (3-oxo-1,2-benzisothiazolin-2-ylcarbonyl)-4-thia - 1 - azabicyclo[3.2.0]hept-6-yl]-3-(3-morpholinopropyl)urea S',S'-dioxide.

References Cited

UNITED STATES PATENTS

| | | | |
|---|---|---|---|
| 3,383,383 | 5/1968 | Gapp et al. | 260—239.1 |
| 3,399,207 | 8/1968 | Bamberg et al. | 260—239.1 |
| 3,453,264 | 7/1969 | Fosker et al. | 260—239.1 |

NICHOLAS S. RIZZO, Primary Examiner

U.S. Cl. X.R.

424—271